US012413605B2

(12) United States Patent
Saito et al.

(10) Patent No.: US 12,413,605 B2
(45) Date of Patent: Sep. 9, 2025

(54) SIGNAL DETECTION APPARATUS, VEHICLE, AND METHOD (71) Applicant: HONDA MOTOR CO., LTD., Tokyo (JP)

(72) Inventors: Daisuke Saito, Tokyo (JP); Yuki Hirono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 82 days.

(21) Appl. No.: 18/341,771

(22) Filed: Jun. 27, 2023

(65) Prior Publication Data
US 2024/0007486 A1 Jan. 4, 2024

(30) Foreign Application Priority Data

Jul. 1, 2022 (JP) ................................. 2022-107261

(51) Int. Cl.
*H04L 9/40* (2022.01)
*H04L 67/12* (2022.01)

(52) U.S. Cl.
CPC ...... *H04L 63/1416* (2013.01); *H04L 63/1483* (2013.01); *H04L 67/12* (2013.01)

(58) Field of Classification Search
CPC . H04L 63/1416; H04L 63/1483; H04L 67/12; H04W 12/121
See application file for complete search history.

(56) References Cited

U.S. PATENT DOCUMENTS 10,798,114 B2 * 10/2020 Galula ................ H04L 63/1425
11,709,274 B2 * 7/2023 Gum ..................... G01S 19/215
342/357.59

(Continued)

FOREIGN PATENT DOCUMENTS

JP 2017073834 A 4/2017
JP 2018117242 A 7/2018

(Continued)

OTHER PUBLICATIONS

Office Action issued for counterpart Japanese Application No. 2022-107261, transmitted from the Japanese Patent Office on Apr. 9, 2024 (drafted on Apr. 1, 2024).

(Continued)

*Primary Examiner* — Javier O Guzman (57) ABSTRACT

A signal detection apparatus includes a signal detection unit which detects signals expected to be input to a communication network in a predetermined cycle, and a determination unit which determines whether detection timing of a second signal detected by the signal detection unit after a first signal which is set as a reference signal for determining an illegal signal is in a predetermined range within which reference timing falls among the signals detected by the signal detection unit, and whether a shift between the detection timing of the second signal and the reference timing is a first threshold or less, in which the determination unit sets the second signal as the reference signal when the shift is the first threshold or less, and sets the first signal as the reference signal without setting the second signal as the reference signal when the shift exceeds the first threshold.

7 Claims, 6 Drawing Sheets (56) References Cited

U.S. PATENT DOCUMENTS

| | | | |
|---|---|---|---|
| 2016/0134503 A1* | 5/2016 | Watson | H04L 43/026 |
| | | | 709/224 |
| 2016/0233302 A1* | 8/2016 | Wu | H01L 21/823885 |
| 2017/0126703 A1 | 5/2017 | Ujiie | |
| 2017/0180370 A1* | 6/2017 | Satoh | G06F 21/565 |
| 2019/0351844 A1 | 11/2019 | Inoue | |
| 2020/0021611 A1 | 1/2020 | Maeda | |
| 2021/0058372 A1* | 2/2021 | Katoh | B60W 50/04 |
| 2021/0232463 A1* | 7/2021 | Kulkarni | H04L 12/40 |
| 2021/0273956 A1 | 9/2021 | Nishimoto | |
| 2021/0320932 A1* | 10/2021 | Tsurumi | H04L 63/20 |
| 2021/0400024 A1* | 12/2021 | Kulkarni | G06F 16/22 |
| 2022/0032966 A1* | 2/2022 | Senda | B60W 50/023 |
| 2022/0264303 A1 | 8/2022 | Hamada | |
| 2023/0037318 A1* | 2/2023 | Foster | G05D 1/0027 |

FOREIGN PATENT DOCUMENTS

| | | | |
|---|---|---|---|
| JP | 2018156450 A | 10/2018 | |
| JP | 2021064921 A | 4/2021 | |
| JP | 2021136631 A | 9/2021 | |
| WO | 2019187350 A1 | 10/2019 | |
| WO | 2021065068 A1 | 4/2021 | |

OTHER PUBLICATIONS

Office Action issued for related Japanese Application No. 2022-106469, transmitted from the Japanese Patent Office on Jul. 29, 2025 (drafted on Jul. 23, 2025).

* cited by examiner

SIGNAL DETECTION APPARATUS, VEHICLE, AND METHOD

The contents of the following Japanese patent application(s) are incorporated herein by reference:
NO. 2022-107261 filed in JP on Jul. 1, 2022.

BACKGROUND

1. Technical Field

The present invention relates to a signal detection apparatus, a vehicle, and a method.

2. Related Art

Patent Document 1 and Patent Document 2 disclose techniques of detecting an illegal signal that is input to a communication network.

LIST OF CITED REFERENCES

Patent Document 1: Japanese Patent Application Publication No. 2021-136631
Patent Document 2: Japanese Patent Application Publication No. 2021-064921

DESCRIPTION OF EXEMPLARY EMBODIMENTS

Hereinafter, the present invention will be described by way of embodiments of the invention, but the following embodiments are not for limiting the invention according to the claims. In addition, not all of the combinations of features described in the embodiments are essential to the solution of the invention.

Figure 1:
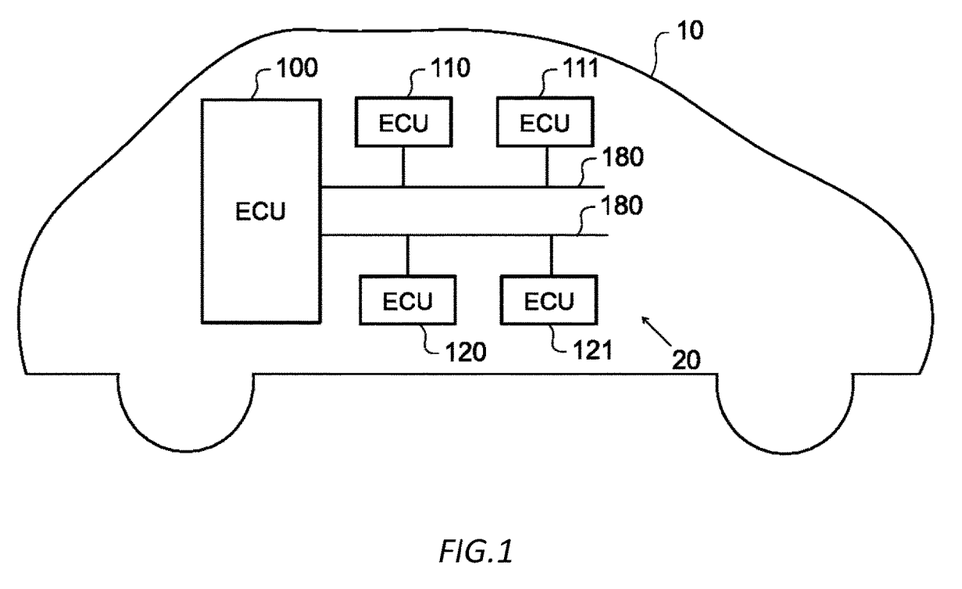
FIG. 1 conceptually illustrates a system configuration of a vehicle 10 in an embodiment.

FIG. 1 conceptually illustrates a system configuration of a vehicle 10 in an embodiment. The vehicle 10 includes a system 20. The system 20 includes a plurality of electronic control units (ECUs) including an ECU 100, an ECU 110, an ECU 111, an ECU 120, and an ECU 121. The ECUs included in the vehicle 10 include an ECU which controls equipment which directly affects travelling of the vehicle 10, such as, for example, an engine, a gearbox, or a steering gear. The ECUs included in the vehicle 10 include an ECU which controls equipment which does not directly affect travelling of the vehicle 10, such as, for example, an air conditioner or a navigation device. The ECU 100, the ECU 110, the ECU 111, the ECU 120, and the ECU 121 are examples of in-vehicle equipment.

The ECUs included in the vehicle 10 mutually perform communication by controller area network (CAN) communication. Each of the ECUs included in the vehicle 10 is connected so as to be mutually communicable by a plurality of CAN communication networks 180. The ECU 100 functions as a gateway which relays communication between the plurality of CAN communication networks 180. The CAN communication network 180 is an example of a communication network.

Figure 2:
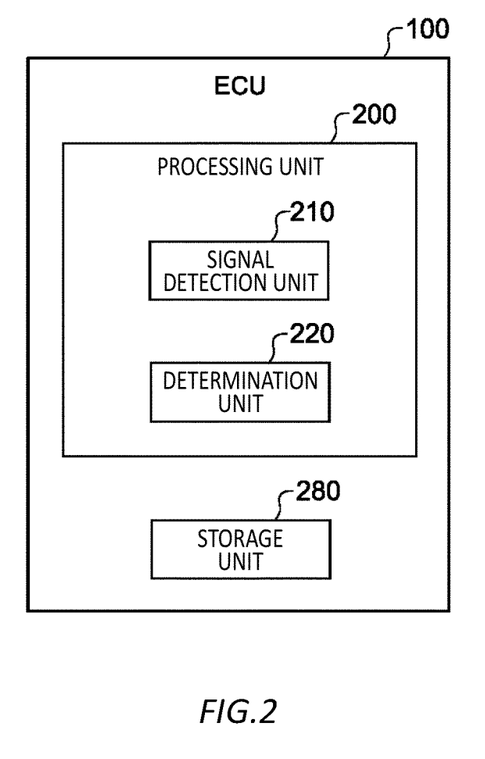
FIG. 2 is a block diagram schematically illustrating a functional configuration included in an ECU 100.

FIG. 2 is a block diagram schematically illustrating a functional configuration included in the ECU 100. The ECU 100 includes a processing unit 200 and a storage unit 280. The ECU 100 performs processing of determining whether there is a transmission of an illegal signal to the CAN communication network 180 by a third party impersonating an ECU included in the vehicle 10, which is so-called an impersonation attack.

The processing unit 200 may be implemented by a processor such as a central processing unit (CPU) which performs computation processing. The storage unit 280 may include a nonvolatile storage medium such as a flash memory or a volatile storage medium such as a random access memory. The ECU 100 may be configured to include a computer. The ECU 100 performs various types of control by the processing unit 200 being operated in accordance with a program stored in the nonvolatile storage medium.

The processing unit 200 includes a signal detection unit 210 and a determination unit 220. The signal detection unit 210 detects signals expected to be input to the CAN communication network 180 in a predetermined cycle. The determination unit 220 determines whether detection timing of a second signal detected by the signal detection unit 210 after a first signal which is set as a reference signal for determining an illegal signal is in a predetermined range within which reference timing that is timing after an integer multiple of a cycle from detection timing of the first signal falls among the signals detected by the signal detection unit 210, and whether a shift between the detection timing of the second signal and the reference timing is a first threshold or less. When the shift between the detection timing of the second signal and the reference timing is the first threshold or less, the determination unit 220 sets the second signal as the reference signal. When the shift between the detection timing of the second signal and the reference timing exceeds the first threshold, the determination unit 220 sets the first signal as the reference signal without setting the second signal as the reference signal. In this manner, even when the second signal may be regarded as a normal signal, the determination unit 220 can set the first signal as the reference signal without setting the second signal as the reference signal when the detection timing is shifted from cycle timing, and can set the second signal as the reference signal when the detection timing is not shifted from the cycle timing. With this configuration, the shift of the reference signal due to a disturbance or the like can be avoided.

When the shift between the detection timing of the second signal and the reference timing is a second threshold or less, the determination unit 220 determines that the detection timing of the second signal is in the predetermined range within which the reference timing falls. The first threshold is less than the second threshold. With this configuration, while whether the signal is an illegal signal is accurately determined by setting the cycle timing as a reference, a normal signal hardly shifted from the cycle timing can be set as the reference signal.

The determination unit 220 determines that the second signal is a normal signal when the detection timing of the second signal is in the predetermined range. With this configuration, it is possible to accurately determine that the second signal is a normal signal.

When the detection timing of the second signal is not in the predetermined range, the determination unit 220 determines that the second signal is not a normal signal, and determines whether the second signal is an illegal signal based on information included in the second signal or/and another signal input to the CAN communication network 180. With this configuration, it is possible to more accurately determine whether the signal is an illegal signal by using internal information included in the signal. That is, if the timings are detected by using a rear end of each signal (reception completion timing of a signal) as the reference, signal length information of the second signal itself which is included in a header of the second signal is used to judge whether the second signal is pushed to the outside of the range in relation to the first signal. To judge this more accurately, it is possible to determine from header information of the first signal or the like whether the second signal is a normal signal that is pushed to the outside of the range due to a relationship between the first signal and the second signal, or is an abnormal signal existing outside of the range due to other factors.

The detection timing of the first signal may be timing at which the signal detection unit 210 has completed the reception of the first signal, and the detection timing of the second signal may be timing at which the signal detection unit 210 has completed the reception of the second signal. For example, when the reception start timing of the signal (or transmission start timing from a transmission source) is used as the detection timing, to determine whether the second signal is delayed due to communication contention with a preceding signal or bus idle latency, a signal length of the preceding signal is to be taken into account in addition to the reception start timing of the preceding signal and the reception start timing of the second signal. That is, when the reception start timing of the signal is used as the detection timing, the signal length of the preceding signal is to be checked. On the other hand, when the reception completion timing of the signal (or transmission completion timing) is used as the detection timing, to determine whether the second signal is delayed due to communication contention with a preceding signal or bus idle latency, the signal length of the second signal is to be taken into account in addition to the reception completion timing of the preceding signal and the reception completion timing of the second signal, but the signal length of the second signal can be acquired from header information of the second signal. Therefore, by using the reception completion timing of the signal as the detection timing, the determination unit 220 can perform the determination from the internal information of the second signal itself without acquiring the signal length of the preceding signal.

Figure 3:
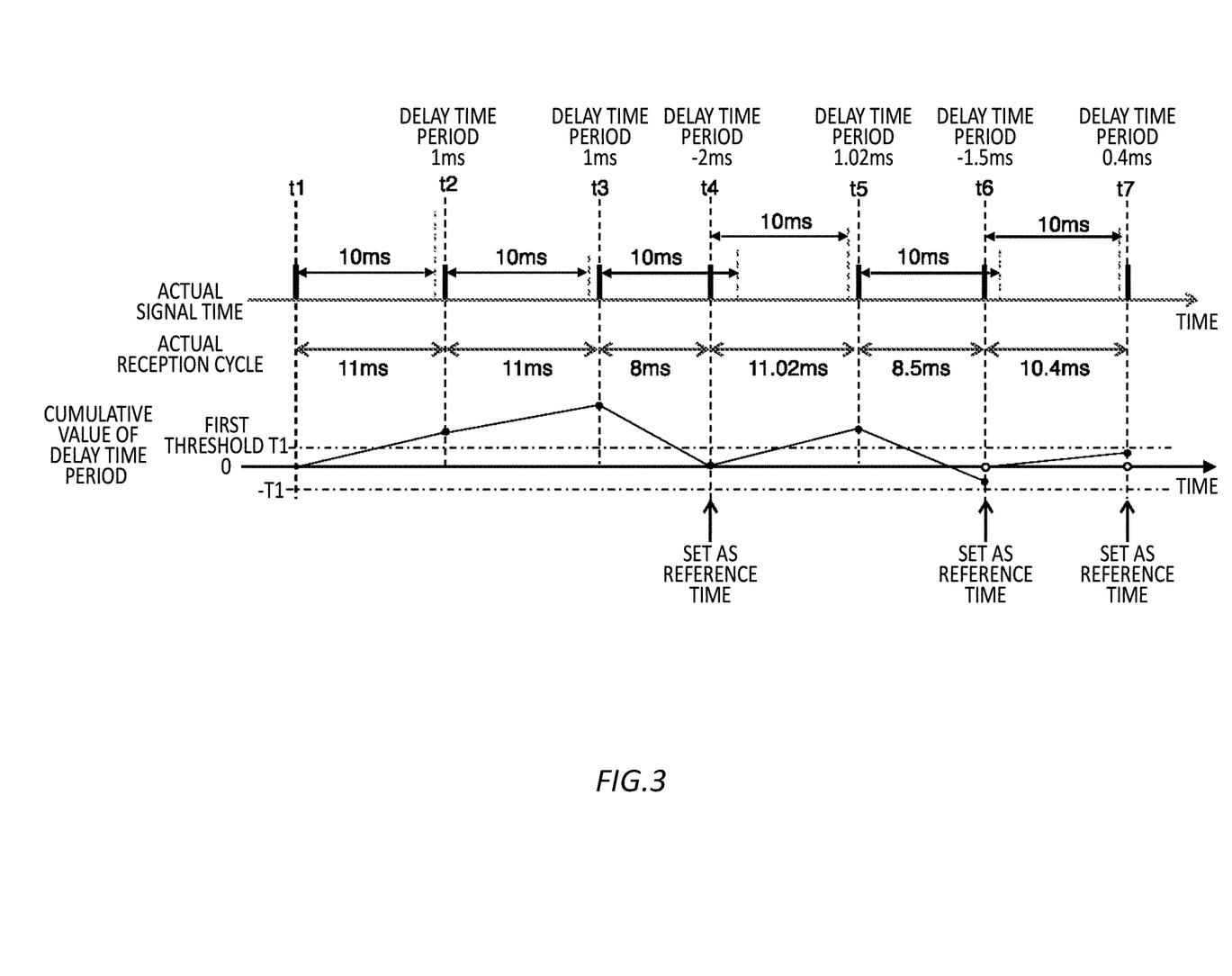
FIG. 3 is a diagram for describing processing of setting a reference time used to detect an illegal signal.

FIG. 3 is a diagram for describing processing of setting a reference time used to detect an illegal signal. FIG. 3 illustrates a time at which the signal detection unit 210 has actually detected a signal on the CAN communication network 180. Note that in the present embodiment, the determination unit 220 determines which one of a plurality of signals to which a same CAN ID has been added is a normal signal. Therefore, in the present embodiment, a description will be provided while focusing on signals to which a particular CAN ID has been added.

In FIG. 3, an actual signal time is a time at which the signal detection unit 210 has actually detected a signal. In the present embodiment, the time at which the signal is detected may be a signal transmission start time. For example, the time at which the signal is detected may be a time at which the signal detection unit 210 has detected the transmission start of the signal. In another embodiment, the time at which the signal is detected may be a transmission completion time of the signal. For example, the time at which the signal is detected may be a time at which the signal detection unit 210 has detected the transmission completion of the signal.

In FIG. 3, an actual signal cycle is a time interval between signals continuously input to the CAN communication network 180. It is assumed that signals set as processing objects in the present embodiment are signals expected to be input to the CAN communication network 180 in a predetermined cycle of 10 ms. According to the present embodiment, to plainly illustrate the processing of setting the reference time, it is assumed that the first threshold is 0.5 ms.

It is assumed that a time t1 is a time at which, after a state is established where communication through the CAN communication network 180 is allowed in the system 20, the signal detection unit 210 receives a signal input to the CAN communication network 180 for the first time. At a time t2 after an elapse of a time period of 11 ms from the time t1, the signal detection unit 210 detects a next signal. The determination unit 220 calculates, as a delay time period, a difference between the time t2 and timing after an elapse of a time period equivalent to a cycle of 10 ms from the time t1. The delay time period at the time t2 becomes 1 ms. Therefore, the determination unit 220 calculates 1 ms as a cumulative value of the delay time period at the time t2. Since the cumulative value of the delay time period exceeds the first threshold, the signal detection unit 210 does not set the signal received at the time t2 as the reference signal.

Subsequently, the signal detection unit 210 further detects a next signal at a time t3 after a further elapse of a time period of 11 ms from the time t2. The determination unit 220 calculates, as the delay time period, a difference between the time t3 and timing after an elapse of a time period of the cycle of 10 ms from the time t2. The delay time period at the time t3 becomes 1 ms. Therefore, the determination unit 220 calculates 2 ms as the cumulative value of the delay time period at the time t3. Since the cumulative value of the delay time period exceeds the first threshold, the signal detection unit 210 does not set the signal received at the time t3 as the reference signal.

Subsequently, the signal detection unit 210 further detects a next signal at a time t4 after a further elapse of a time period of 8 ms from the time t3. The determination unit 220 calculates, as the delay time period, a difference between the time t4 and timing after an elapse of a time period of the cycle of 10 ms from the time t3. The delay time period at the time t4 becomes −2 ms. Therefore, the determination unit 220 calculates 0 ms as the cumulative value of the delay time period at the time t4. Since the cumulative value of the delay time period is the first threshold or less, the signal detection unit 210 sets the signal received at the time t4 as the reference signal, and sets the time t4 as the reference time.

Subsequently, the signal detection unit 210 further detects a next signal at a time t5 after a further elapse of a time period of 11.02 ms from the time t4. The determination unit 220 calculates, as the delay time period, a difference between the time t5 and timing after an elapse of a time period of the cycle of 10 ms from the time t4. The delay time period at the time t5 becomes 1.02 ms. Therefore, the determination unit 220 calculates 1.02 ms as the cumulative value of the delay time period at the time t5. Since the cumulative value of the delay time period exceeds the first threshold, the signal detection unit 210 does not set the signal received at the time t5 as the reference signal.

Subsequently, the signal detection unit 210 further detects a next signal at a time t6 after a further elapse of a time period of 8.5 ms from the time t5. The determination unit 220 calculates, as the delay time period, a difference between the time t6 and timing after an elapse of a time period of the cycle of 10 ms from the time t5. The delay time period at the time t6 becomes −1.5 ms. Therefore, the determination unit 220 calculates −0.48 ms as the cumulative value of the delay time period at the time t6. Since an absolute value of the cumulative value of the delay time period is the first threshold or less, the signal detection unit 210 sets the signal received at the time t6 as the reference signal, and sets the time t6 as the reference time. At this time, the determination unit 220 resets a cumulative value of the delay time period to 0.

Subsequently, the signal detection unit 210 further detects a next signal at a time t7 after a further elapse of a time period of 10.4 ms from the time t6. The determination unit 220 calculates, as the delay time period, a difference between the time t7 and timing after an elapse of a time period of the cycle of 10 ms from the time t6. Since the cumulative value of the delay time period is reset to 0 at the time t6, the delay time period at the time t7 becomes 0.4 ms. Therefore, the determination unit 220 calculates 0.4 ms as the cumulative value of the delay time period at the time t7. Since the cumulative value of the delay time period is the first threshold or less, the signal detection unit 210 sets the signal received at the time t7 as the reference signal, and sets the time t7 as the reference time.

In this manner, when a new signal is detected, if a shift between the timing at which the new signal is detected and the reference timing that is timing after an integer multiple of the signal cycle from the reference time is the first threshold or less, the determination unit 220 sets the new signal as the reference signal, and sets a time at which the new signal is detected as the reference time used to detect an illegal signal.

Figure 4:
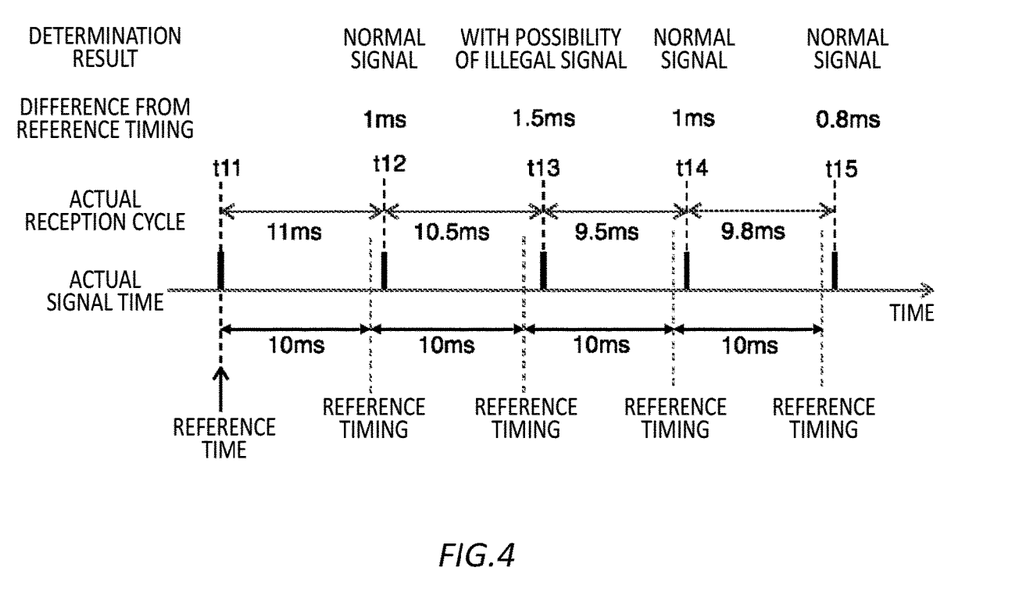
FIG. 4 is a diagram for describing processing for a determination unit 220 to determine an illegal signal.

FIG. 4 is a diagram for describing processing for a determination unit 220 to determine an illegal signal. With reference to FIG. 4, a case will be described where a determination is made on whether a signal which is detected after a time t11 is set as the reference time is an illegal signal. According to the present embodiment, to plainly illustrate the processing of determining whether the signal is an illegal signal, it is assumed that the second threshold for determining whether the signal is a normal signal is 1 ms. That is, it is assumed that when the time at which the signal is detected is in a range of ±1 ms in which the reference timing calculated from the reference time is set as a center, it is determined that the detected signal is a normal signal. According to the present embodiment, for the purpose of ease of illustration, a description will be provided where the first threshold (0.5 ms) is set as ½ of the second threshold (1 ms), but the first threshold may be ⅕ or less of the second threshold. The first threshold may be ¹⁄₁₀ of the second threshold.

With reference to FIG. 4, the signal detection unit 210 detects a new signal at a time t12 after an elapse of 11 ms from the time t11. The determination unit 220 sets a time after 10 ms from the reference time as the reference timing. A difference between the time t12 and the reference timing is 1 ms. That is, the time t12 is in the range of ±1 ms in which the reference timing is set as the center. Therefore, the determination unit 220 determines that the signal detected at the time t12 is a normal signal.

Subsequently, the signal detection unit 210 detects a new signal at a time t13 after an elapse of 10.5 ms from the time t12. The determination unit 220 sets a time after 10×2 ms from the reference time as the reference timing. A difference between the time t13 and the reference timing is 1.5 ms. That is, the time t13 is not in the range of ±1 ms in which the reference timing is set as the center. Therefore, the determination unit 220 determines that the signal detected at the time t13 may be an illegal signal.

The determination unit 220 may determine whether the signal detected at the time t13 is an illegal signal based on information included in the signal detected at the time t13 and/or information included in the signal transmitted to the CAN communication network 180 immediately before the signal detected at the time t13. For example, the determination unit 220 may determine whether the signal detected at the time t13 is delayed due to contention with another signal at the time of transmission based on a signal length included in header information of each signal and a detection time of each signal. When it is determined that the signal detected at the time t13 is delayed due to contention with another signal at the time of transmission, the determination unit 220 may determine that the signal detected at the time t13 is a normal signal. When it is determined that the signal detected at the time t13 is not delayed due to contention with another signal at the time of transmission, the determination unit 220 may determine that the signal detected at the time t13 is an illegal signal.

Subsequently, the signal detection unit 210 detects a new signal at a time t14 after an elapse of 9.5 ms from the time t13. The determination unit 220 sets a time after 10×3 ms from the reference time as the reference timing. A difference between the time t14 and the reference timing is 1 ms. That is, the time t14 is in the range of ±1 ms in which the reference timing is set as the center. Therefore, the determination unit 220 determines that the signal detected at the time t14 is a normal signal.

Subsequently, the signal detection unit 210 detects a new signal at a time t15 after an elapse of 9.8 ms from the time t14. The determination unit 220 sets a time after 10×4 ms from the reference time as the reference timing. A difference between the time t15 and the reference timing is 0.8 ms. That is, the time t15 is in the range of ±1 ms in which the reference timing is set as the center. Therefore, the determination unit 220 determines that the signal detected at the time t15 is a normal signal.

In this manner, when a new signal is detected, the determination unit 220 sets, as the reference timing, timing after an integer multiple of the cycle from the reference time. When the detection timing of the new signal is in a predetermined range within which the reference timing falls, the determination unit 220 may determine that the new signal is a normal signal. On the other hand, when the detection timing of the new signal is not in the predetermined range within which the reference timing falls, the determination unit 220 may determine that the new signal is an illegal signal.

Figure 5:
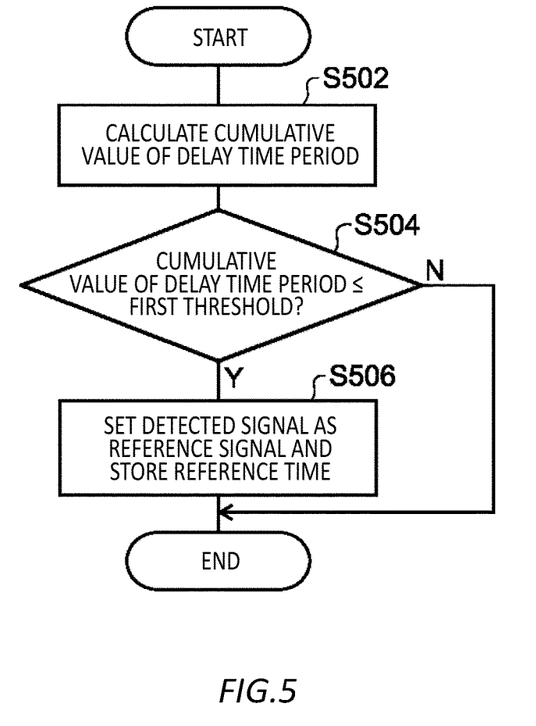
FIG. 5 is a flowchart related to a signal detection method performed by an ECU 110.

FIG. 5 is a flowchart related to a signal detection method performed by the ECU 110. FIG. 5 is a flowchart related to processing of setting a reference time. The processing of the flowchart in FIG. 5 may be performed each time the signal detection unit 210 detects a signal.

When the signal detection unit 210 detects a signal, in S502, the determination unit 220 calculates a cumulative value of the delay time period for the detect signal based on a currently set reference time, a current cumulative value of the delay time period, and a detection time of the signal. In S504, the determination unit 220 determines an absolute value of the cumulative value of the delay time period is the first threshold or less. When the absolute value of the cumulative value of the delay time period is the first threshold or less, in S506, the determination unit 220 sets, as the reference signal, a signal detected by the signal detection unit 210, and the storage unit 280 stores a detection time of the signal as the current reference time.

In S506, when the absolute value of the cumulative value of the delay time period exceeds the first threshold, the determination unit 220 ends the processing of the present flowchart without updating the reference time.

Moreover, when the absolute value of the cumulative value of the delay time period exceeds the first threshold, under a condition that an elapsed period of time from the current reference time until the detection time of the signal exceeds a predetermined period of time, the determination unit 220 may set the detection time of the signal as the reference time. When a certain error exists in a cycle for a signal to be actually input to the CAN communication network 180, an error is also caused in the reference timing calculated based on the reference time and the cycle. Therefore, when the reference time is not updated for a long period of time, since an error caused in the reference timing is accumulated, an erroneous determination on whether the signal is a normal signal may be performed. When an elapsed period of time from the current reference time exceeds a predetermined period of time, by setting the detection time of the new signal as the reference time, it may be possible to reduce a likelihood that the erroneous determination on whether the signal is a normal signal is performed due to the cumulative error.

In the CAN communication network 180, when contention is caused at the time of input of a signal to the CAN communication network 180, the signal is to be transmitted according to a priority rank by way of communication arbitration, and a delay may be caused until the signal is actually transmitted. Therefore, when the determination on an illegal signal is performed while a detection time of the delayed signal is set as the reference time, whether the signal is a normal signal may be erroneously determined. In contrast to this, according to the system 20, when the signal detection unit 210 detects a new signal, if a shift between the timing at which the new signal is detected and the reference timing that is timing after an integer multiple of the signal cycle from the reference time is the first threshold or less, the determination unit 220 sets the new signal as the reference signal, and sets a time at which the new signal is detected as the reference time. With this configuration, it becomes possible to set the reference time more appropriately for detecting a signal which is input in an unauthorized manner to the CAN communication network 180. Furthermore, it becomes possible to appropriately detect the signal which is input in an unauthorized manner to the CAN communication network 180.

Figure 6:
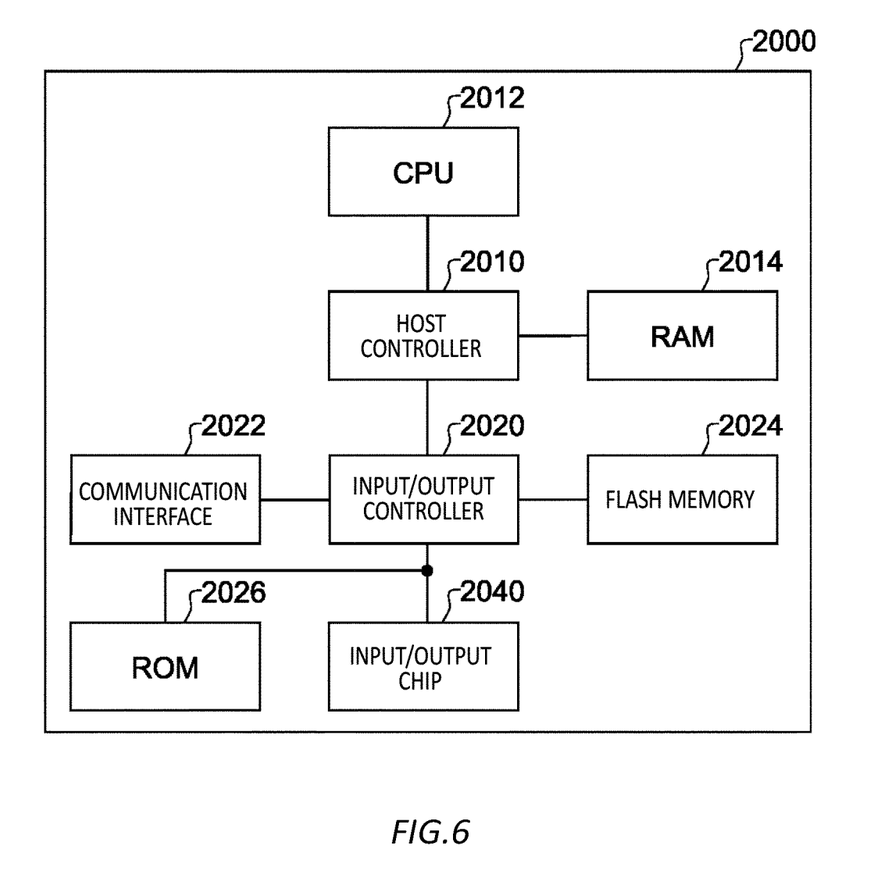
FIG. 6 illustrates an example of a computer 2000.

FIG. 6 illustrates an exemplary computer 2000 in which a plurality of embodiments of the present invention may be wholly or partially embodied. A program installed in the computer 2000 can allow the computer 2000 to: function as systems such as the system 20 according to embodiments or each unit of the systems, or as apparatuses such as the ECU 110 or each unit of the apparatuses; perform operations associated with the systems or each unit of the systems or with the apparatuses or each unit of the apparatuses; and/or perform processes according to embodiments or steps in the processes. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, or an HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014, or the ROM 2026 and executed by the CPU 2012. Information processing written in these programs is read by the computer 2000, and provides cooperation between the programs and the various types of hardware resources described above. A device or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and write back a result into the RAM 2014. In addition, the CPU 2012 may search for information in a file, a database, or the like in the recording medium. For example, when multiple entries, each having an attribute value of a first attribute associated with an attribute value of a second attribute, is stored in the recording medium, the CPU 2012 may search for an entry having a designated attribute value of the first attribute that matches a condition from the multiple entries, and read the attribute value of the second attribute stored in the entry, thereby obtaining the attribute value of the second attribute associated with the first attribute that satisfies a predefined condition.

The programs or software modules explained above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program, which is installed on the computer 2000 and causes the computer 2000 to function as the ECU 110, may work on the CPU 2012 or the like to cause the computer 2000 to function as each unit of the ECU 110. The information processing written in these programs are read by the computer 2000 to cause the computer to function as each unit of the ECU 110, which is specific means realized by the cooperation of software and the various types of hardware resources described above. Then, by the specific means realizing calculation or processing of information according to a purpose of use of the computer 2000 in the present embodiment, the unique ECU 110 according to the purpose of use is constructed.

Various embodiments have been explained with reference to the block diagrams and the like. In the block diagrams, each block may represent (1) a stage of a process in which an operation is executed, or (2) each unit of the device having a role in executing the operation. A specific stage and each unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means which executes processing procedures or operations specified in the block diagrams. An example of the computer-readable storage medium may include an electronic storage medium, a magnetic storage medium, an optical storage medium, an electromagnetic storage medium, or a semiconductor storage medium. More specific examples of the computer-readable storage medium may include a floppy disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or other programmable data processing device, or to programmable circuit, locally or via a local area network (LAN), wide area network (WAN) such as the Internet, and a computer-readable instruction may be executed to provide means which executes operations specified in the explained processing procedures or block diagrams. Examples of the processor include a computer processor, a processing unit, a microprocessor, a digital signal processor, a controller, a microcontroller, and the like.

While the present invention has been described by way of the embodiments, the technical scope of the present invention is not limited to the above described embodiments. It is apparent to persons skilled in the art that various alterations or improvements can be made to the above described embodiments. It is also apparent from the description of the claims that the embodiments to which such alterations or improvements are made can be included in the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: vehicle;
20 system;
100: ECU;
110: ECU;
111: ECU;
120: ECU;
121: ECU;
180: CAN communication network;
200: processing unit;
210: signal detection unit;
220: determination unit;
280: storage unit;
2000: computer;
2010: host controller;
2012: CPU;

2014: RAM;
2020: input/output controller;
2022: communication interface;
2024: flash memory;
2026: ROM;
2040: input/output chip.

What is claimed is:

1. A signal detection apparatus comprising:

a signal detection unit which detects signals expected to be input to a communication network in a predetermined cycle; and a determination unit which determines whether detection timing of a second signal detected by the signal detection unit after a first signal which is set as a reference signal for determining an illegal signal is in a predetermined range within which reference timing that is timing after an integer multiple of the cycle from detection timing of the first signal falls among the signals detected by the signal detection unit, and whether a shift between the detection timing of the second signal and the reference timing is a first threshold or less, wherein the determination unit sets the second signal as the reference signal when the shift between the detection timing of the second signal and the reference timing is the first threshold or less, sets the first signal as the reference signal without setting the second signal as the reference signal when the shift between the detection timing of the second signal and the reference timing exceeds the first threshold, determines that the detection timing of the second signal is in the predetermined range within which the reference timing falls when the shift between the detection timing of the second signal and the reference timing is a second threshold or less, wherein the first threshold is less than the second threshold, determines that the second signal is a normal signal when the detection timing of the second signal is in the predetermined range, and determines that the second signal is not a normal signal when the detection timing of the second signal is not in the predetermined range, and determines whether the second signal is an illegal signal based on information included in the second signal or/and another signal input to the communication network.

2. The signal detection apparatus according to claim 1, wherein the determination unit determines that the second signal is not a normal signal when the detection timing of the second signal is not in the predetermined range, and determines whether the second signal is an illegal signal based on information included in the second signal and another signal input to the communication network.

3. The signal detection apparatus according to claim 1, wherein the detection timing of the first signal is timing at which the signal detection unit completes reception of the first signal, and the detection timing of the second signal is timing at which the signal detection unit completes reception of the second signal.

4. The signal detection apparatus according to claim 1, wherein the communication network is a controller area network (CAN) communication network.

5. The signal detection apparatus according to claim 4, wherein the first signal and the second signal are signals including a same CAN ID (Identifier).

6. The signal detection apparatus according to claim 1, wherein the signal detection apparatus is installed in a vehicle.

7. A method comprising:

detecting signals expected to be input to a communication network in a predetermined cycle;

determining whether detection timing of a second signal detected after a first signal which is set as a reference signal for determining an illegal signal is in a predetermined range within which reference timing that is timing after an integer multiple of the cycle from detection timing of the first signal falls among the signals detected in the detecting, and whether a shift between the detection timing of the second signal and the reference timing is a first threshold or less;

setting the second signal as the reference signal when the shift between the detection timing of the second signal and the reference timing is the first threshold or less; and setting the first signal as the reference signal without setting the second signal as the reference signal when the shift between the detection timing of the second signal and the reference timing exceeds the first threshold;

determining that the detection timing of the second signal is in the predetermined range within which the reference timing falls when the shift between the detection timing of the second signal and the reference timing is a second threshold or less, wherein the first threshold is less than the second threshold;

determining that the second signal is a normal signal when the detection timing of the second signal is in the predetermined range; and determining that the second signal is not a normal signal when the detection timing of the second signal is not in the predetermined range, and determining whether the second signal is an illegal signal based on information included in the second signal or/and another signal input to the communication network.

* * * * *